UNITED STATES PATENT OFFICE.

JAMES PERRY, OF BROOKLYN, NEW YORK.

IMPROVEMENT IN MAKING BREAD.

Specification forming part of Letters Patent No. 40,707, dated November 24, 1863.

*To all whom it may concern:*

Be it known that I, JAMES PERRY, of Brooklyn, in the county of Kings, in the State of New York, have invented a certain new and useful Improvement in the Process of Making Bread; and I do hereby declare that the following is a full, clear, and exact description thereof.

My invention consists in the combination of certain chemical and mechanical processes. I use a part, more or less modified, of the previously-known and long-practiced chemical means of rising known to chemists as "panary fermentation," in combination with the modern method of lightening the dough by mechanically expanding the interstices, which is generally denominated "aeration."

The process of fermentation, as hitherto applied to the preparation of dough for bread, results in a succession of chemical transmutations of the flour, the conditions of some of the first of which are favorable to the production of good dough, but those resulting from further and subsequent changes being wasteful, injurious, and productive of unpalatable bread.

It is the object of this invention to carry the process of fermentation, in the preparation of dough for bread, just so far as the conditions experienced and the materials used shall, with the aid of aeration, render desirable for the production of light, palatable, and healthful bread. I therefore produce on the whole or portions of the starch of the flour only those changes between the normal starch condition and that stage of fermentation at which aldehyde and acetic acid commence to form, which are best adapted to effect the end in view. I prefer to perform separately certain chemical operations on the dough, which, if united, would be likely to interfere and defeat the purposes of this invention.

In the manufacture of bread by fermentation alone there are no effective means to prevent the acetification of the alcohol which is evolved along with the requisite quantity of carbonic-acid gas to leaven the loaves, and hence neutralization of the acetic acid has been extensively resorted to as the remedy for the defects of the fermentive process.

The manufacture of bread by kneading the dough under a pressure of gas, or by generating carbonic-acid gas by the decomposition of carbonated salts with vegetable acids, is defective, for the reason that the starch does not receive the necessary change, but remains in its crude condition, rendering it more difficult of digestion and less assimilable by the organs of nutrition.

Before proceeding to describe the several details of my invention, I will briefly set forth the general laws which are involved and the changes to which my invention relates.

Physiologists separate the various substances used as food by man into two distinct classes—to wit, the azotized and the non-azotized. Nearly or quite all food contains one or more azotized sub-elements, of which there are now supposed to be but four—to wit, fibrine, gluten, caseine, and albumen. The very different substances—starch, gum, sugar, oils, and fats—belong to the other class—the non-azotized. Many varieties of food contain one or more of each class. The various kinds of flour from which bread is made contain principally one of each class, to wit: gluten and starch. The gluten contains azote or nitrogen—the element in all food which is necessary to build up the muscles and tissues of the animal system. The starch maintains animal heat by the union of its carbon with oxygen, the union of the elements forming carbonic-acid gas, which is expelled from the lungs as a waste product—a process of slow combustion which adds nothing to the system but vital force.

In the preparation of bread by fermentation, or by any other process, the chemical constitution of the gluten should not be changed; and with good flour and yeast in skillful hands the process of fermentation consists in transformations wrought upon the starch alone. As fermentation commences and advances the molecular arrangement of the atoms of starch is so far altered by the chemical union of water therewith as to constitute, first, dextrine—a substance allied to gum-arabic—and, finally, a new product, known as "fruit-sugar." This, as fermentation further advances, is broken up into carbonic-acid gas and alcohol, both of which contribute—the latter by its vaporization in the oven and the former by its permanently-gaseous condition—to make the bread light; but it is very difficult or impossible in practice to cause the action to take place uniformly and to stop it at the right point. As fermentation proceeds the alcohol parts with some of its hydrogen and passes into the unstable compound known as "aldehyde." Next the aldehyde combines with more oxygen and forms acetic acid, commonly known as "vinegar." The aldehyde, as soon as formed in the dough, commences to attack and dissolve the gluten—the most valuable nutrient principle in the flour—and so soon as acetic acid is formed this destructive action becomes more rapid. The bread is now soured, and the disorganization of all the proximate principles subject to the fermentation proceeds rapidly. The entire mass of the starch is not subjected to these changes simultaneously. A large portion may remain in the condition of starch, while other particles are far more advanced; but during the earlier steps in the series this fact is not important, and the chemical changes of either considerable portions or very minute quantities of the starch to dextrine sugar, carbonic acid, and alcohol are all favorable to the production of bread of the quality and properties desired.

Were it not for the compounds subsequently formed by the destruction and oxidation of the alcohol while fermentation continues the entire process of fermentation might be looked upon as favorable; but if only a few particles are allowed to travel too far upon the road to decay evils are experienced, and drugging is resorted to for the purpose of allaying their effects upon the senses.

The object of fermentation is or should be the production not alone of light bread, but of bread which is also in the highest measure palatable, nutritious, and digestible. This is not uniformly or usually attainable under the conditions described. The chemical manipulations at the later stages are so delicate that bakers with a life-long experience and with all the facilities pertaining to their trade can rarely make two batches of bread which are alike even to the senses.

In order to induce and continue fermentation in the sponge, it is necessary under the most favorable circumstances to set it at about 65° Fahrenheit, and it frequently rises to 90° and 100° before the fermentation is checked in baking. At the temperature of about 90° the alcohol passes so rapidly into aldehyde and acetic acid that the effect in destroying the azotized portion of the material becomes visible to the eye. The glutinous substance in the flour, which had formed the membrane around the grains of starch, assumes a darkened or bluish cast. This discoloration greatly impairs the whiteness of the bread, and in practice leads to the use of alum as a bleaching drug—an adulteration to which there is no temptation in the manufacture of bread by my process.

By accident it sometimes happens that good bread is produced by fermentation. This occurs when the conditions are favorable to the production of carbonic-acid gas and its equivalents of alcohol from the decomposition of the saccharine product previously formed in the dough and when the elements of the alcohol have retained the alcoholic constitution—that is, before they have passed into aldehyde or acetic acid—but no amount or kind of medicating with alkalies and drugs can restore the healthful condition of the sponge after it has passed beyond the proper stage of fermentation. The recently-invented process of aeration is radically different from all this. The process of aeration, as its name implies, is founded on the idea of producing no organic or chemical change whatever in the ingredients, except what arises in the baking.

In the manufacture of aerated bread carbonic-acid gas is obtained from some external source, and by mechanical means is forced, at a high pressure, into a strong vessel containing proper quanties of flour, salt, and water. It is agitated for a brief period, and then is drawn out through a meter or stop-valve without chemical change, and immediately swells or rises by the mechanical expansion of the gas. Carbonic-acid gas is used because it is the cheapest of neutral gases, it being found that atmospheric air acts chemically and disadvantageously. All that is required to produce light, white, and nutritious bread by aeration is good flour, pure carbonic-acid gas, salt, and water, with means of abstracting the atmospheric air from the ingredients before or while kneading them, and means to keep the temperature below 60° Fahrenheit.

In my combination of the two processes, as before intimated, I mechanically knead a suitable aeriform fluid into the dough under any degree of pressure suited to the product required, after the dough, batter, or paste has been subjected to a certain degree of incipient fermentation or saccharification, which I prefer to induce by the agency known as "diastase." My dough may be used either unflavored or flavored with caseine solutions, extracts, culinary salt, &c., as desired.

To enable others skilled in the art to make and use my invention, I will now proceed to describe the apparatus and the several specific operations whereby I propose to apply the same in practice. I can do this with sufficient clearness for good mechanics and bakers without the necessity for drawings.

I first prepare an extract of malt. I do this by the aid of a metallic vessel with a perforated plate or strainer a little above the bottom, the whole inclosed within a wooden vessel or case. A crank gives motion to an agitator inclosed in the upper part of the metallic vessel, and a pipe and cock are provided to discharge the liquid contents from the lower part. Steam and water pipes are properly connected to heat and cool the apparatus at will by admitting steam or circulating water within the wooden vessel or case so as to come in contact with the metallic vessel. A movable cover is securely attached to the metallic vessel, and a tube and cap are provided therein for receiving a thermometer to determine the temperature by inspection at any moment. A quantity of water is put into the metallic vessel and raised to the temperature of 175° Fahrenheit by admitting steam to the space between it and the wooden case. The steam is then shut off, and enough ground malt admitted while the agitator is in motion to reduce the temperature to about 150° Fahrenheit, and after ten to fifteen minutes gentle agitation the motion is stopped and the mash left to dissolve from one and a half to two hours. At the end of this period the solution may be drawn clear from the base of the vessel, and is ready to be mixed with the flour for the preparation of the bread. If the solution at first appears too cloudy it may be poured into the top and allowed to percolate down through the mashed malt and again be drawn from the lower vessel after a little time. I prefer to effect this by the aid of five pieces of apparatus, which I will describe in the order in which they are used—viz., the malt-vessel, the fermenting-vessel, the storing-vessel, the meter, and the aerating-vessel.

I prefer this apparatus for the reasons, among others, that it affords great facilities for varying the temperature at each stage of the process, according to the quality and peculiar character of the flour, and for excluding the air during the entire process, it being evident that a great variety of changes in the delicate chemical conditions may be produced by varying the time and temperature in the preparation of the diastase solution and the saccharification of the starch of flour, as also by the admission of oxygen or the air and caseous and other azotized substances. While this malt solution is being made I prepare to ferment or saccharify the flour by the aid of an apparatus substantially similar to the malt-vessel just described, except that it is larger and is not provided with a strainer. In this fermenting-vessel I raise the temperature of a mass of water to 150° Fahrenheit, and after adding the malt solution from the the malt apparatus first described proceed to add flour while the agitator is operated until the mass is of such consistency as will form a thin gelatinous paste when cold. One hundred pounds malt give about twenty-five gallons of solution, which is added to about seventy-five gallons of water and one hundred pounds of flour; but all these qualities may be varied within wide limits, according to the quality of the flour used and the fancy of the baker. The paste is left for an hour or an hour and a half to saccharify under the above temperature and gentle motion, and is then cooled by admitting cold water to flow through the space between the metallic vessels and the inclosing case in the manner previously described. When the contents of the fermenting-vessel are cooled to the proper degree—about 60° Fahrenheit—they are discharged into a third vessel, from which they may be immediately taken, if desired; or they may be allowed to remain in the third vessel at the low temperature designated, and the same process may be repeated until there is a sufficient stock accumulated in the third vessel, which I denominate the "storing-vessel," for the work required. This storing-vessel should be provided with an agitator, and should, like all the others, be provided with a cover capable of fitting tightly and being readily removed and replaced. In the preparation of the dough for bread a quantity of the thin paste may be run out of the storing-vessel into a suitable meter, and a quantity of water may be added thereto, the diastase solution being usually sufficiently energetic to saccharify a large quantity of flour to be subsequently added. The diluted contents of the meter are now discharged into the mixing or kneading vessel, which is the fifth and the last in the series. This is a strong metallic globe with internal mixing and kneading machinery, precisely such as is used for making bread by aeration alone. In this vessel the flour and salt are added, and the whole is thoroughly kneaded under a pressure of carbonic-acid gas, and finally discharged into pans. The dough expands mechanically as it escapes from the compression, and forms loaves of the size and shape desired.

It is desirable by every process to prepare bread that it shall be in the very highest degree palatable, nutritious, and digestible, and that it shall be produced at a minimum cost. I believe that these ends are best attained by letting the solution in the storing-vessel have age enough to give evidence of the generation of carbonic-acid gas, but not to let it run far into the alcoholic fermentation, as this would be likely to give rise to aldehyde and acetic acid, neither of which should be permitted to exist; but a little alcohol is of decided advantage with some qualities of flour, and it may be introduced, along with a caseine solution, as a solvent for the caseine in the use of the weaker brands of flour, or those which contain too little gluten. The addition of these elements will, in such case, improve the flavor and increase the azotized element therein.

It is practicable to hasten and increase the chemical action by the use of various materials, which are well known to chemists, and my diastase solution, which I have described as produced in my first vessel, is not absolutely essential to the working of my invention; but I very greatly prefer to use such.

The liability to the formation of lactic acid by prolonging the process for saccharifying the starch renders it necessary, where a considerable quantity is to be operated upon, that convenient means for refrigeration shall be available, and that power to agitate the materials be easily applied ; but the process herein described may be applied through very simple and cheap utensils for domestic use, or by bakers doing a small business.

Having thus fully described my invention and the general nature of the changes it is proposed to effect in the dough, I wish it to be distinctly understood that I do not confine myself to the precise apparatus, temperatures, times, and quantities herein described; but

What I claim as my invention, and desire to secure by Letters Patent, is as follows:

In the manufacture of farinaceous food, the combination of the fermentive and aerative processes, substantially as described, and for the purposes herein set forth.

JAMES PERRY.

Witnesses:
  THOMAS D. STETSON,
  W. A. HENDRICKSON.